(12) United States Patent
Vaughn et al.

(10) Patent No.: US 11,093,274 B2
(45) Date of Patent: Aug. 17, 2021

(54) OPEN INTERFACE MANAGEMENT OF VIRTUAL AGENT NODES

(71) Applicant: International Business Machines Corporation, Armonk, NY (US)

(72) Inventors: Garfield Vaughn, South Windsor, CT (US); Vasanthi M. Gopal, Plainsboro, NJ (US); Gandhi Sivakumar, Bentleigh (AU)

(73) Assignee: International Business Machines Corporation, Armonk, NY (US)

( * ) Notice: Subject to any disclaimer, the term of this patent is extended or adjusted under 35 U.S.C. 154(b) by 260 days.

(21) Appl. No.: 16/298,398

(22) Filed: Mar. 11, 2019

(65) Prior Publication Data

US 2020/0293349 A1 Sep. 17, 2020

(51) Int. Cl.
*G06F 9/455* (2018.01)
*G06N 20/00* (2019.01)
*H04L 12/24* (2006.01)

(52) U.S. Cl.
CPC ......... *G06F 9/45558* (2013.01); *G06N 20/00* (2019.01); *H04L 41/0213* (2013.01); *G06F 2009/45591* (2013.01); *G06F 2009/45595* (2013.01)

(58) Field of Classification Search
None
See application file for complete search history.

(56) References Cited

U.S. PATENT DOCUMENTS

| 10,445,223 | B1* | 10/2019 | Tkac ....................... G06F 9/455 |
| 2011/0029618 | A1 | 2/2011 | Lavy et al. |
| 2011/0213642 | A1 | 9/2011 | Makar et al. |
| 2014/0258525 | A1 | 9/2014 | Yang |
| 2017/0093640 | A1* | 3/2017 | Subramanian ...... H04L 41/5058 |
| 2018/0025726 | A1 | 1/2018 | Gatti de Bayser et al. |
| 2018/0253780 | A1* | 9/2018 | Wang ..................... H04L 51/02 |

FOREIGN PATENT DOCUMENTS

| CN | 104301157 A | 1/2015 |
| CN | 107508713 A | 12/2017 |

OTHER PUBLICATIONS

Author Unknown, FCAPS, Wikipedia, Oct. 23, 2018, pp. 1-6, Wikimedia Foundation, Inc., Published at: https://en.wikipedia.org/wiki/FCAPS.

* cited by examiner

*Primary Examiner* — Lewis A Bullock, Jr.
*Assistant Examiner* — Melissa A Headly
(74) *Attorney, Agent, or Firm* — Christopher M. Pignato; Nicholas L. Cadmus

(57) ABSTRACT

Cognitive software and/or machine learning software are monitored in a cognitive computing environment. Open interface management of virtual agent nodes is performed in the cognitive computing environment.

20 Claims, 7 Drawing Sheets

OPEN INTERFACE MANAGEMENT OF VIRTUAL AGENT NODES

BACKGROUND

The present invention relates to management of deployed software-based cognitive virtual assistants/agents. More particularly, the present invention relates to open interface management of virtual agent nodes.

Virtual agent nodes are software entities that are installed on a variety of devices, such as cellular telephones and other devices. Virtual agent nodes are designed to interact with human users of those devices to assist the users with answers related to use of the devices, service plans available for use of the devices, or other forms of information.

SUMMARY

A computer-implemented method includes, by at least one processor(s) set, monitoring cognitive software and/or machine learning software in a cognitive computing environment; and performing open interface management of virtual agent nodes in the cognitive computing environment.

A system that performs the computer-implemented method and a computer program product that causes a computer to perform the computer-implemented method are also described.

DETAILED DESCRIPTION

Figure 1:
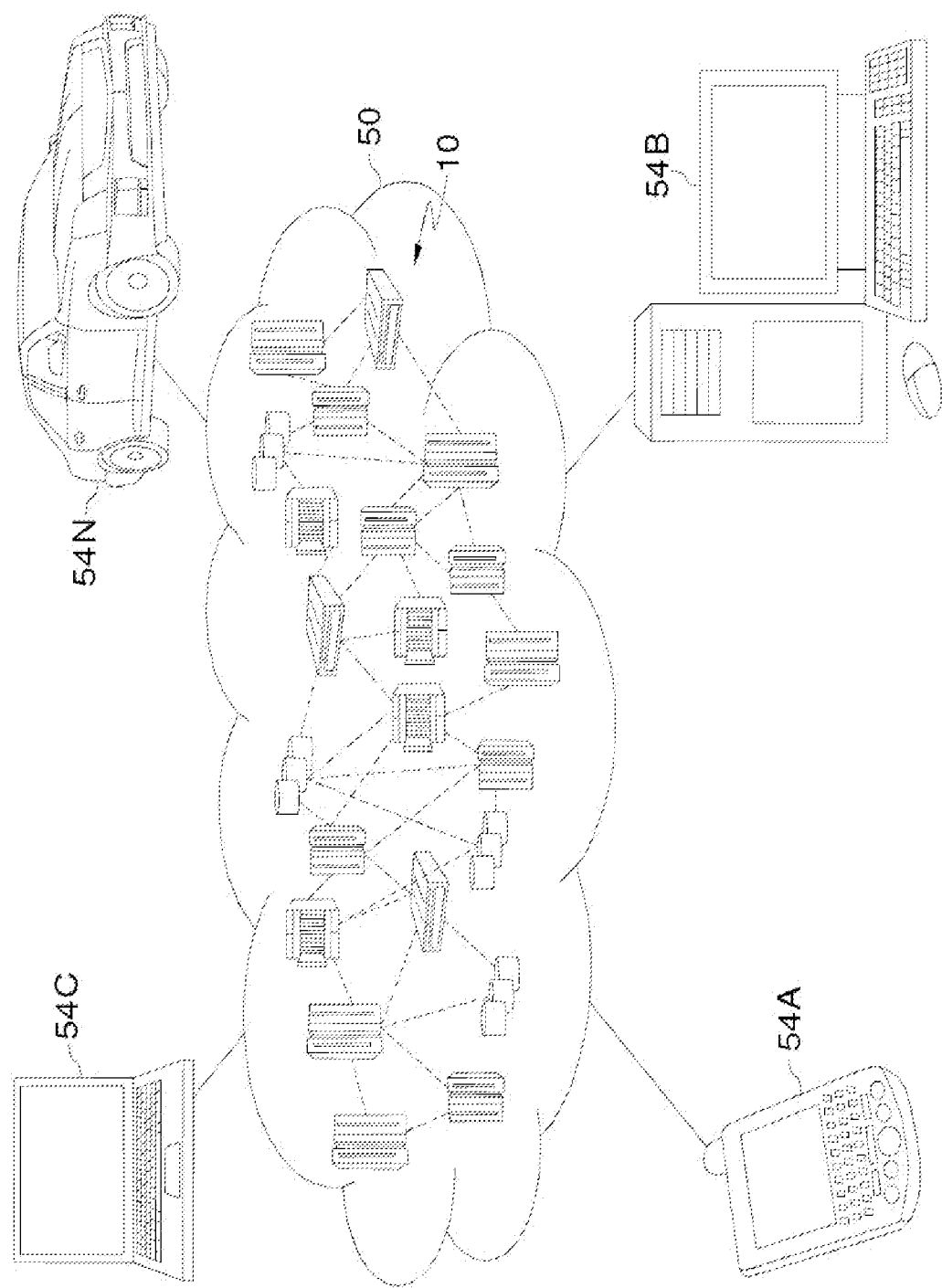
FIG. 1 depicts a cloud computing environment according to an embodiment of the present invention.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides open interface management of virtual agent nodes. Virtual agent nodes are alternatively termed "virtual agents," "virtual assistants," or "VAs" herein for ease of reference. Virtual agents are "cognitive entities (CEs)" by design, and as designed are software entities based upon "cognitive models" enabled by use of Big Data platforms. The subject matter described herein provides an open interface that is standardized for management of virtual agents across a variety of installation platforms and patterns, as further described below. In certain implementations, the technology described herein extends and enhances conventional simple network management protocol (SNMP) to provide new "cognitive" management features and capabilities that allow remote control and management of deployed cognitive virtual agents. However, it should be understood that any management protocol that implements the technical details described herein may be utilized as appropriate for a given implementation. When implemented using SNMP as a protocol foundation, the cognitive technological enhancements to SNMP and the resulting protocol described herein are termed "cognitive SNMP" (C-SNMP). When any other protocol is utilized or cognitive management is referred to more broadly, the technology described herein is termed a "cognitive management protocol."

As cognitive entities within a rapidly-emerging area of computing technology, virtual agents are designed to remember the past, to interact with humans, to continuously learn from these interactions, and to refine their responses for future interactions according to what they learn from previous interactions. Virtual agents are further designed to interact verbally with a device user through automated voice generation and voice recognition technologies to assist a device user with use of the device, with searching for information, and with other forms of helpful tasks. The present technology solves several recognized virtual agent management problems described in more detail below by providing a new form of virtual agent communication interface/protocol that improves remote monitoring and management of virtual agents that are deployed within complex and distributed computing platforms.

It should be noted that there is no standardized approach to deployment, interface/management interactions, upgrades, and other aspects of virtual agent nodes. As a result, a technical problem exists because each virtual agent node may have a different communication interface and command set. The technology described herein solves this technology problem. Specifically, the technology described herein provides technical features that improve interoperation of virtual agents and virtual agent management nodes by providing a standardized interface where standards did not previously exist. By implementation of the new interface standardization described herein, virtual agent nodes may be managed more effectively for deployment, interface/management interactions, upgrades, and a variety of other operations to which virtual agents may be deployed now or in the future.

Some terminology and deployment platform options used in describing some embodiments of the present technology will now be explained. The technology described herein may be implemented in a variety of management platforms. For example, an apparatus in blue stack platforms, such as IBM Tivoli Composite Application Manager (ITCAM) may be extended and enhanced to implement the technology described herein. Additionally, other network management tools may be extended and enhanced. The International Standardization Organization (ISO) model defines certain network management tasks termed fault, configuration, accounting, performance, and security (FCAPS). The technology described herein extends and enhances conventional FCAPS by adding "cognitive" aspects and control features to the ISO model. The added "cognitive" aspects are termed "cognitive management tasks" herein, and the resulting augmented ISO model is termed "C-FCAPS" herein. C-FCAPS enhances the conventional management categories of the ISO model-based network management tasks to add cognitive management tasks for remote management and control of deployed virtual agents. A new form of management entity, termed a "C-FCAPS SNMP Manager" herein, may be deployed in multiple typed patterns (e.g., strongly-typed, federated, or consolidated patterns), and may perform an open-interface based management of deployed virtual agent nodes. These typed-pattern deployment solutions may be formed into a two-tier or a three-tier model, with the deployed virtual agents capturing the various parameters of the respective nodes within the respective tiered model(s). To obtain information and results of various cognitive management tasks, the C-FCAPS SNMP Managers may poll the deployed virtual agents, or the deployed virtual agents may send alarms, notifications, and other VA-initiated communications, hereinafter collectively termed "traps," to report the information and results of various cognitive management tasks to the C-FCAPS SNMP Managers.

The technology described herein operates by monitoring cognitive software and/or machine learning software in a cognitive computing environment, and performing open interface management of virtual agent nodes in the cognitive computing environment It should be noted that conception of the present subject matter resulted from recognition of certain limitations associated with remote management of virtual agents as remote executing software components. For example, it was observed that virtual agents are being deployed in continually-increasing numbers on mobile devices, such as smart phones and on other types of devices/platforms, to perform increasing varieties of tasks. Additionally, virtual agents may be deployed through federated or other patterns. However, it was determined that there is no unified monitoring or management solution across so many platforms and installations that may be leveraged. As such, the increasing numbers of deployed virtual agents and the complexities associated with virtual agent management across this variety of deployment patterns and platforms has resulted in a virtual agent management problem because there is no standardized technology by which to monitor and tune performance of these deployed virtual agents across so many different technologies. Specifically, it was observed that it has become technically difficult to: (i) manage deployed virtual agents to provide/adjust configuration(s), (ii) to interact remotely with deployed virtual agents, (iii) to query information and configuration information from deployed virtual agents, and (vi) to tune performance of deployed virtual agents as remote executing software components. As a result, it was determined that there is a technological need to provide an open-interface enabled management capability for remote virtual agents across these different typed deployment patterns and platforms. It was further observed that in traditional network management, such as within the telecommunications industry, management/monitoring of network equipment (e.g., devices) is performed by use of Simple Network Management Protocol (SNMP). However, it was determined that this conventional technology is not designed for management of cognitive-specific capabilities of deployed software-based virtual agents. The present subject matter improves remote virtual agent management by extending the open interface provided by SNMP to facilitate remote management of virtual/cognitive software agents and by providing a new form of "cognitive" SNMP-based management of virtual agents (VAs), as described above and in more detail below. As such, improved deployment and ongoing management of virtual agents may be obtained through use of the present technology.

As introduced above, SNMP is a standardized communication protocol that was designed and conventionally used to remotely control and monitor devices, such as telecommunications devices. SNMP defines messaging operations that may be performed from a controlling device to set ("put") or retrieve ("get") various device parameters and/or device configuration values of a remote device that is being controlled by the controlling device. The remote device may additionally initiate communications in the form of an alarm/trap to report information to the controlling device. The subject matter described herein extends SNMP into "cognitive SNMP" (C-SNMP), which is a new form of open interface management of virtual agent nodes in a cognitive computing environment. By use of C-SNMP, as described herein, cognitive software and/or machine learning software may be monitored, and open interface management of virtual agent nodes in a cognitive computing environment may be performed efficiently and effectively as a technological advancement in distributed cognitive computing.

As introduced above, the various typed deployment patterns within which virtual agents may be deployed include strongly-typed patterns, federated patterns, and consolidated patterns. In strongly-typed patterns, a virtual agent is centralized and is a point of contact for a set of nodes/devices. The C-FCAPS SNMP Manager directly interacts with the virtual agent and retrieves virtual agent object identifiers (VA-OIDs) based upon a configured polling frequency of the virtual agent(s), or the respective virtual agents may send traps to the C-FCAPS SNMP manager. In the federated pattern, the C-FCAPS SNMP manager interacts with multiple virtual agents, and thereby forms a virtual layer of virtual agents. In the consolidated pattern, the C-FCAPS SNMP manager creates a consolidated model of the virtual agents and performs the C-FCAPS function by use of the consolidated model to interact with the deployed virtual agents. Virtual agent object identifiers (VA-OIDs) and virtual agent management information bases (VA-MIBs) are each tree structures that organize the various parameters that are used to control and manage virtual agents, and will be described in more detail below after the following the system descriptions.

Accordingly, the subject matter described herein for open interface management of virtual agent nodes provides several technical advantages over conventional technologies. For example, the C-FCAPS SNMP manager provides and facilitates open interface-based monitoring and management of cognitive models for virtual agent nodes. The subject matter described provides a tiered architecture for monitoring and management of virtual agent nodes and management entities independently or in combination within any of the federated models, consolidated models, and strongly-typed models. The technology described herein provides object identifiers for cognitive parameters that are exposed to consuming information managers, such as for monitoring statistics, configuration, billing, and other features related to virtual nodes. The present technology is capable of guarding and abstracting both exposure and access of the virtual nodes through a security layer based on the respective consuming information managers to which the virtual agent nodes are exposed. Further, cognitive agents may be provided within a hierarchy of layered cognitive capabilities that are layered selectively as appropriate and varied for each particular implementation. As the implementations change over time, the hierarchy and layering of the cognitive capabilities may be adjusted to account for the respective changes. As such, the technology provides capabilities to form dynamic cognitive/virtual agent groups and assign dynamic cognitive virtual agent managers from distributed virtual agent nodes or layered cognitive capabilities, and these dynamic agent groups and managers may also be changed over time to accommodate changes in deployment architectures and features. Agents may be further assigned to collect parameters at their respective nodes and to provide those parameters to managing entities. Example parameters that may be collected for a particular node include, among other possible parameters, a number of utterances handled according to the defined specification (e.g., utterances per second, per minute, etc.); a number of utterances that resulted in flow through to another service/entity or to an alternative form of assistance (e.g., another cognitive entity, initiation of communication between the device user and technical support or customer service personnel, etc.); a number of utterances that resulted in successful responses (e.g., question answered, search completed, etc.); and/or, a number of utterances that resulted in unsuccessful responses (e.g., I don't know, etc.). The technology described herein provides cognitive capabilities for virtual agents to assert traps to the respective monitoring managers for bi-directional integration within the complex and dynamic deployment options described above. Accordingly, the technology described herein extends conventional SNMP standards to provide new technology for monitoring the Cognitive ecosystem, thus enabling the existing network management systems (NMS) with extended capability of service monitoring, which may reduce costs in addition to providing the technological advancements described herein.

The open interface management of virtual agent nodes described herein may be performed in real time to allow prompt management and reconfiguration/tuning of virtual agents. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

Additional detailed of the algorithmic processing and computational efficiencies will be provided further below. The following portion of the present description provides examples of advanced computational platform(s) within which the present technology may be implemented, followed by further details of the open interface management of virtual agent nodes described herein.

It should be noted that the present technology may be implemented within or as part of a cloud computing environment (e.g., for data analytics associated with management of deployed virtual agents), or may be implemented as a customized environment-specific solution. As such, examples of implementations for both environments are included herein. Additionally, the following examples illustrate several types of computing devices upon which virtual agents may be deployed and managed.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
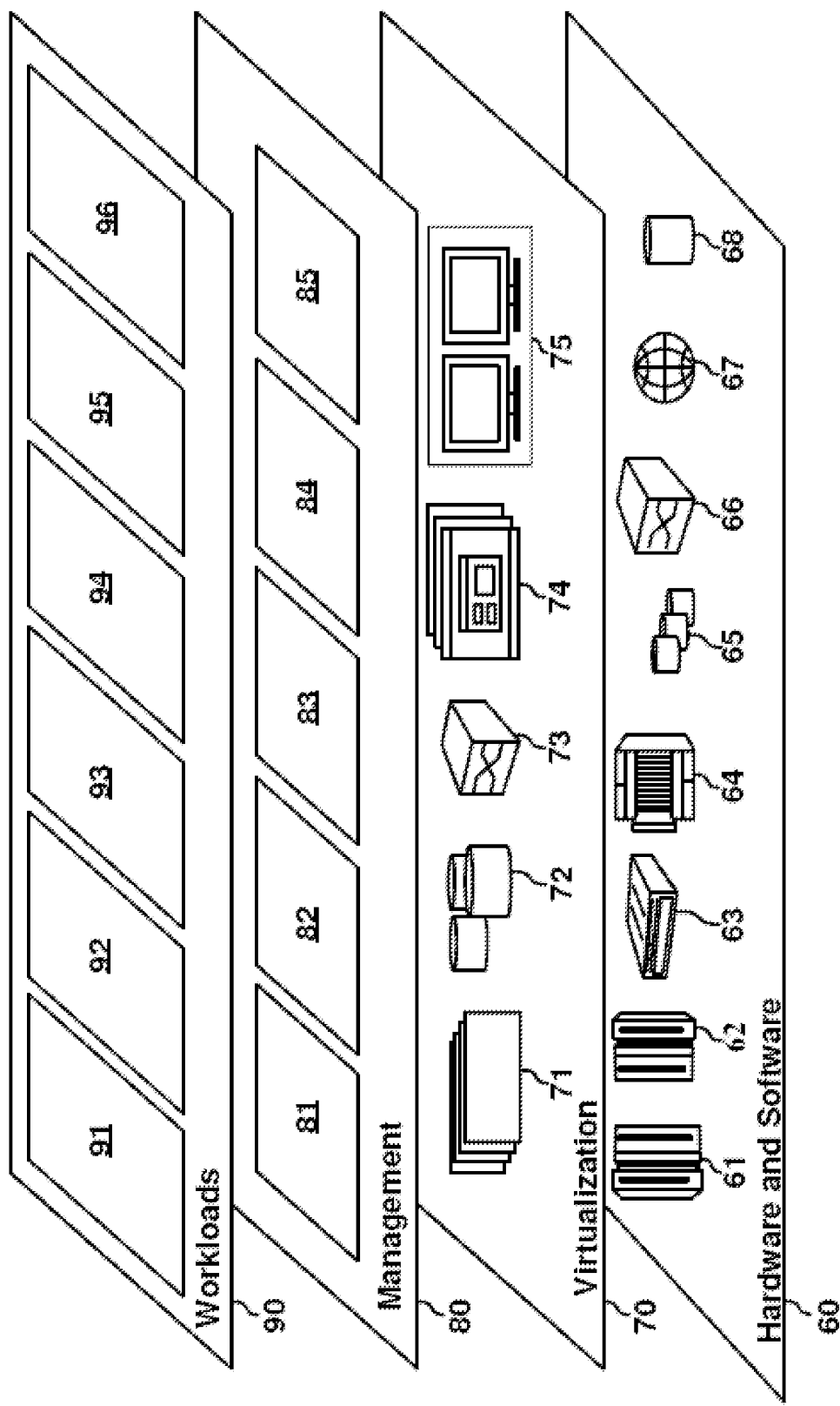
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and open interface management of virtual agent nodes 96.

Within the examples above, the cloud computing environment illustrates several types of computing devices 54A-N upon which virtual agents may be deployed and managed. Regarding alternative platform implementation options, FIGS. 3 and 4 below are directed to such alternatives. It should be understood that the various alternatives may be combined with or substituted with the implementation options described above and below, as appropriate for the given implementation.

Figure 3:
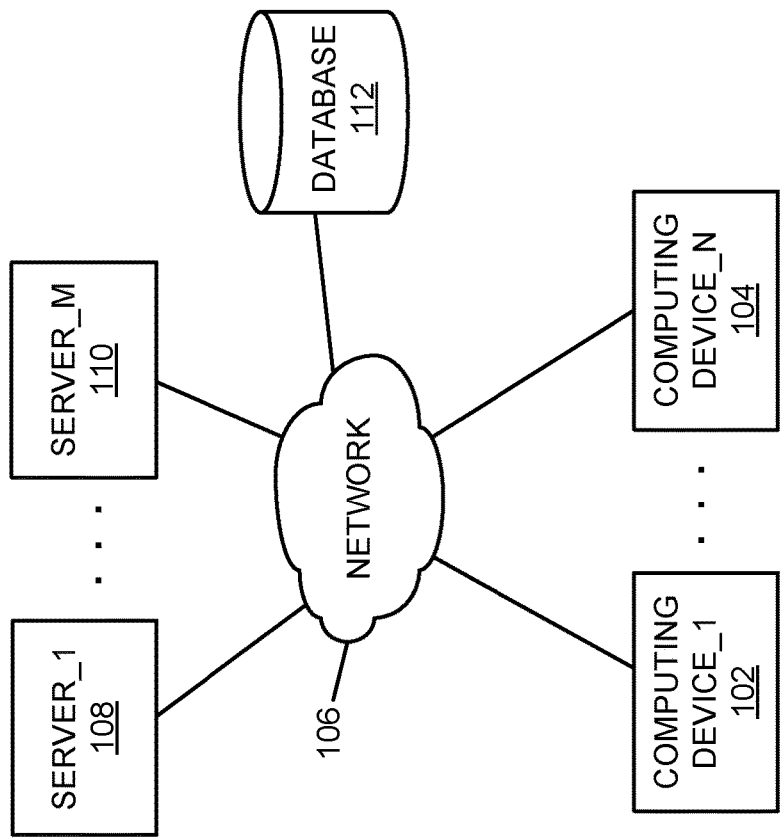
FIG. 3 is a block diagram of an example of an implementation of a system for open interface management of virtual agent nodes according to an embodiment of the present subject matter.

FIG. 3 is a block diagram of an example of an implementation of a system 100 for open interface management of virtual agent nodes. A computing device_1 102 through a computing device_N 104 communicate via a network 106 with several other devices. The other devices include a server_1 108 through a server_M 110. The computing device_1 102 through the computing device_N 104 may each host a virtual agent for communications with a user of the respective computing device. Further, one or more of the server_1 108 through the server_M 110 may each operate as a C-FCAPS SNMP Manager that manages and controls the virtual agents deployed on the computing device_1 102 through the computing device_N 104, as described above and in more detail below. As described above, the deployments of virtual agents within the system 100 may be provided within a hierarchy of layered cognitive capabilities that are layered selectively as appropriate and varied for each particular implementation. Further, the various deployment patterns within which virtual agents may be deployed include strongly-typed deployment patterns, federated deployment patterns, and consolidated deployment patterns. A database 112 represents one or more physical storage devices and may store configuration, management, and deployment information for use in control and management of virtual agent nodes by the respective server_1 108 through the server_M 110.

As will be described in more detail below in association with FIG. 4 through FIG. 7, the server_1 108 through the server_M 110 may each provide automated open interface management of virtual agent nodes. The open interface management of virtual agent nodes is based upon standardized management of virtual agents across a variety of the deployment patterns described above.

In view of the implementation alternatives described above, the present technology may be implemented within a cloud computing platform, at a user computing device, at a server device level, or by a combination of such platforms and devices as appropriate for a given implementation. A variety of possibilities exist for implementation of the present subject matter, and all such possibilities are considered within the scope of the present subject matter.

The network 106 may include any form of interconnection suitable for the intended purpose, including a private or public network such as an intranet or the Internet, respectively, direct inter-module interconnection, dial-up, wireless, or any other interconnection mechanism capable of interconnecting the respective devices.

The server_1 108 through the server_M 110 may include any device capable of providing data for consumption by a device, such as the computing device_1 102 through the computing device_N 104, via a network, such as the network 106. As such, the server_1 108 through the server_M 110 may each include a web server, application server, or other data server device.

The database 112 may include a relational database, an object database, or any other storage type of device. As such, the database 112 may be implemented as appropriate for a given implementation.

Figure 4:
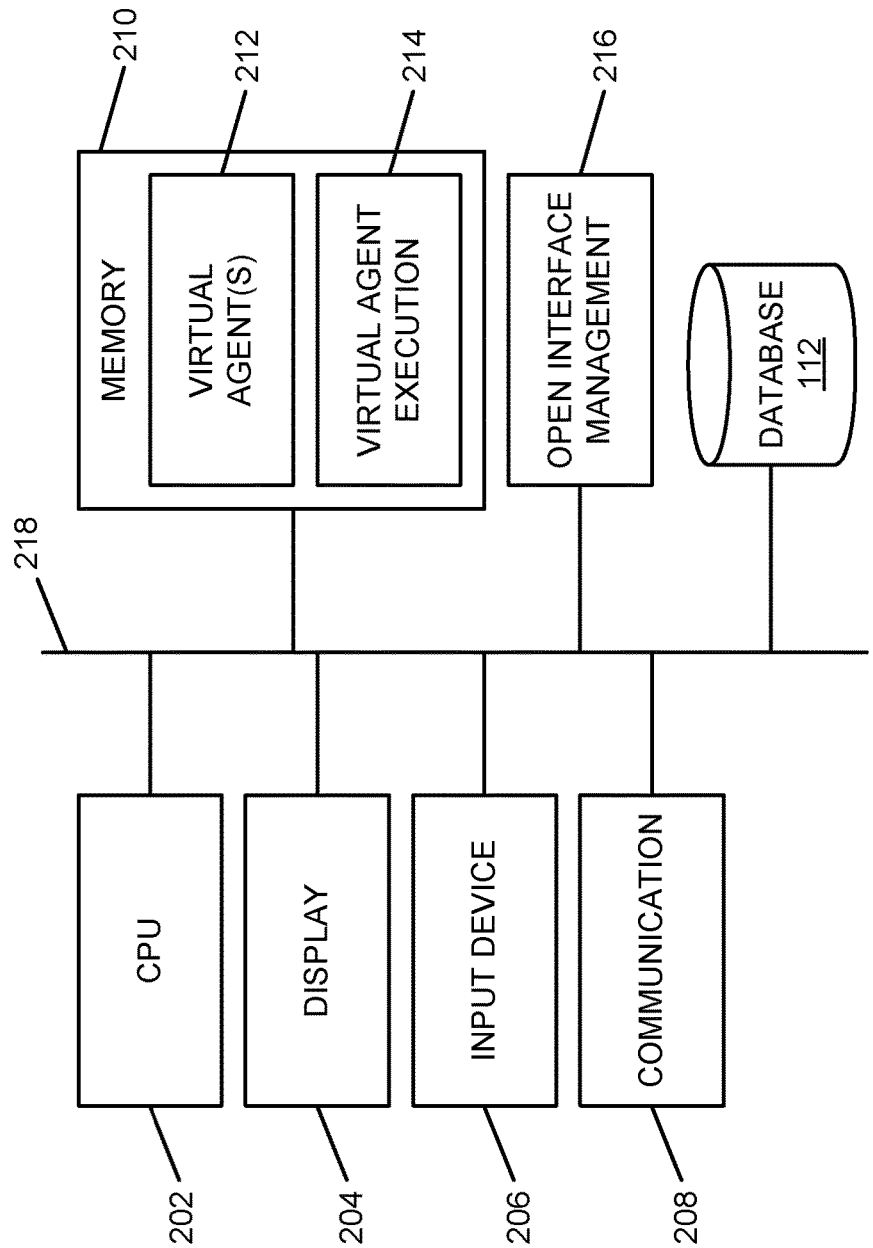
FIG. 4 is a block diagram of an example of an implementation of a core processing module capable of performing processing associated with open interface management of virtual agent nodes according to an embodiment of the present subject matter.

FIG. 4 is a block diagram of an example of an implementation of a core processing module 200 capable of performing processing associated with open interface management of virtual agent nodes. The core processing module 200 may be associated with either the computing device_1 102 through the computing device_N 104 or with the server_1 108 through the server_M 110, or with devices within the cloud computing environment 50, as appropriate for a given implementation. As such, the core processing module 200 is described generally herein, though it is understood that many variations on implementation of the components within the core processing module 200 are possible and all such variations are within the scope of the present subject matter. Further, the core processing module 200 may be implemented as an embedded processing device with circuitry designed specifically to perform the processing described herein as appropriate for a given implementation.

The core processing module 200 may provide different and complementary processing associated with open interface management of virtual agent nodes in association with each implementation. As such, for any of the examples below, it is understood that any aspect of functionality described with respect to any one device that is described in conjunction with another device (e.g., sends/sending, etc.) is to be understood to concurrently describe the functionality of the other respective device (e.g., receives/receiving, etc.).

A central processing unit (CPU) 202 ("processor" or "application-specific" processor) provides hardware that performs computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, touchscreen, a microphone and voice command processing unit, or any other type of input device by which the user may interact with and respond to information on the display 204.

A communication module 208 provides hardware, protocol stack processing, and interconnection capabilities that allow the core processing module 200 to communicate with other modules within the system 100, or within the cloud computing environment 50, as appropriate for a given implementation. The communication module 208 may include any electrical, protocol, and protocol conversion capabilities useable to provide interconnection capabilities, as appropriate for a given implementation. As such, the communication module 208 represents a communication device capable of carrying out communications with other devices. The communication module 208 may further include one or more wireless communication capabilities, as appropriate for the given implementation.

A memory 210 includes a virtual agent(s) storage area 212 that stores configuration information for one or more virtual agents within core processing module 200. The virtual agent(s) configuration information may include deployment information, parameter configuration(s), collected parameter data, or other information, as appropriate for the given implementation. Further, the virtual agent(s) configuration information may be associated with one or more virtual agents that are either executing locally or deployed at different computing nodes, as appropriate for a given implementation.

A virtual agent execution area 214 provides execution space for one or more executing virtual agents. It is understood that other applications may be executed within the memory 210.

It is further understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, an operating system storage area, a code execution area, and a data area without departure from the scope of the present subject matter.

An open interface management module 216 is also illustrated. The open interface management module 216 provides virtual agent deployment and management capabilities for the core processing module 200, as described above and in more detail below. As such, the open interface management module 216 implements the automated open interface management of virtual agent nodes of the core processing module 200.

It should also be noted that the open interface management module 216 may form a portion of other circuitry described without departure from the scope of the present subject matter. The open interface management module 216 may form a portion of an interrupt service routine (ISR), a portion of an operating system, or a portion of an application without departure from the scope of the present subject matter. The open interface management module 216 may also include an embedded device with circuitry designed specifically to perform the processing described herein as appropriate for a given implementation.

The database 112 is again shown within FIG. 4 associated with the core processing module 200. As such, the database 112 may be operatively coupled to the core processing module 200 without use of network connectivity, as appropriate for a given implementation.

The CPU 202, the display 204, the input device 206, the communication module 208, the memory 210, the open interface management module 216, and the database 112 are interconnected via an interconnection 218. The interconnection 218 may include a system bus, a network, or any other interconnection capable of providing the respective components with suitable interconnection for the respective purpose.

Though the different modules illustrated within FIG. 4 are illustrated as component-level modules for ease of illustration and description purposes, it should be noted that these modules may include any hardware, programmed processor (s), and memory used to carry out the functions of the respective modules as described above and in more detail below. For example, the modules may include additional controller circuitry in the form of application specific integrated circuits (ASICs), processors, antennas, and/or discrete integrated circuits and components for performing communication and electrical control activities associated with the respective modules. Additionally, the modules may include interrupt-level, stack-level, and application-level modules as appropriate. Furthermore, the modules may include any memory components used for storage, execution, and data processing for performing processing activities associated with the respective modules. The modules may also form a portion of other circuitry described or may be combined without departure from the scope of the present subject matter.

Additionally, while the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. Many other possible arrangements for components of the core processing module 200 are possible and all are considered within the scope of the present subject matter. It should also be understood that, though the database 112 is illustrated as a separate component for purposes of example, the information stored within the database 112 may also/alternatively be stored within the memory 210 without departure from the scope of the present subject matter. Accordingly, the core processing module 200 may take many forms and may be associated with many platforms.

Figure 5:
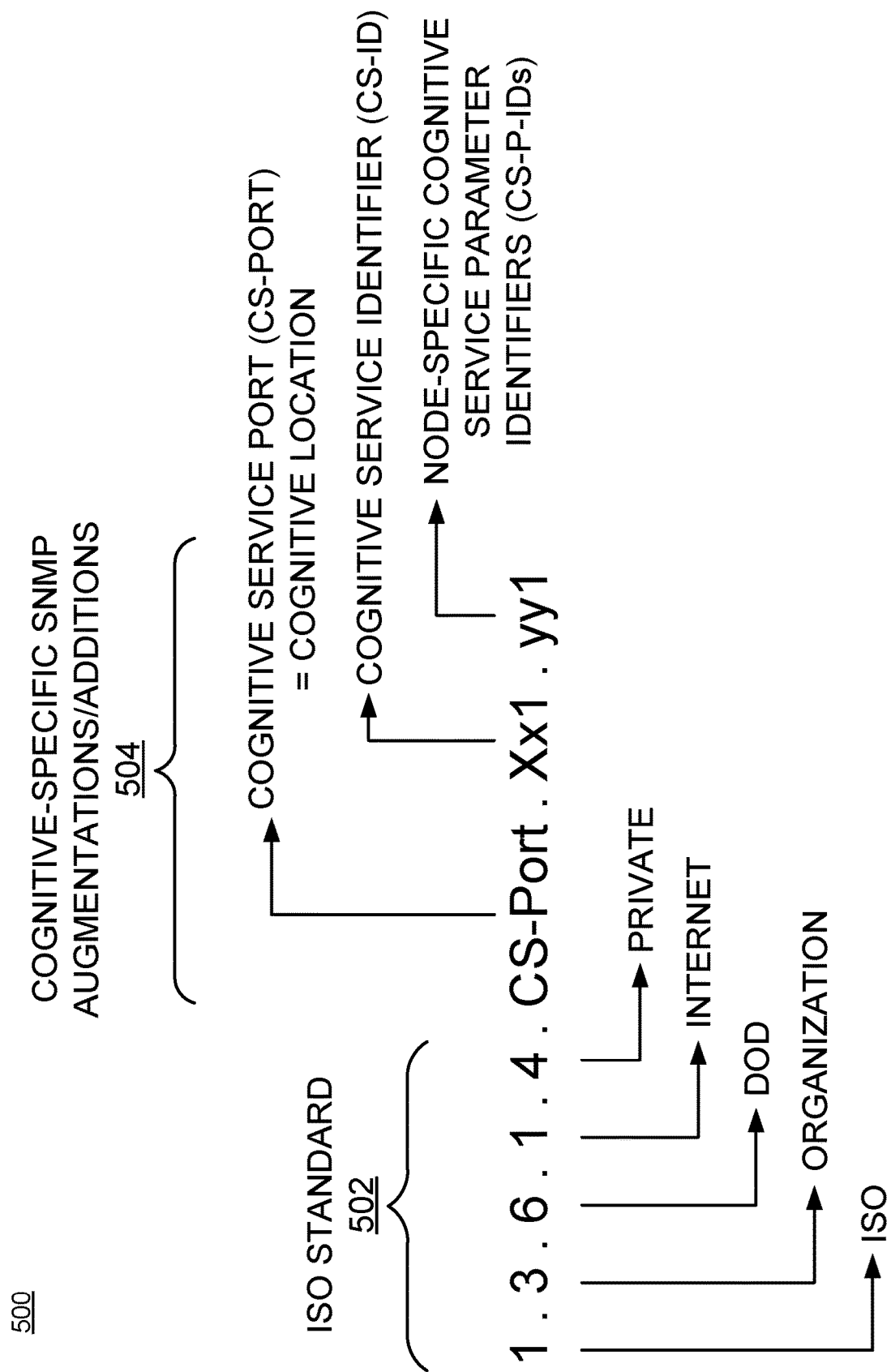
FIG. 5 is a diagram of an example of an implementation of a virtual agent object identifier (VA-OID) for locating and accessing virtual agents and their respective parameters to implement open interface management of virtual agent nodes according to an embodiment of the present subject matter.

FIG. 5 is a diagram of an example of an implementation of a virtual agent object identifier (VA-OID) 500 for locating and accessing virtual agents and their respective parameters to implement open interface management of virtual agent nodes. It should be noted that the VA-OID is extended and modified from the ISO variant of OIDs (e.g., beginning with a one "1" at its root), though it is understood that additional variants of OIDs exist and the technology described herein may be applied to any such variant. The VA-OID illustrated within FIG. 5 represents an extension of the OID structure that allows a C-FCAPS SNMP manager to reach an object/node in a virtual agent management information base (VA-MIB).

As can be seen in FIG. 5, element 502 collectively represents the first five dot-separated integers, namely 1.3.6.4.1, of the VA-OID 500 as a set. The element 502 represents standard ISO fields/values, where the first field/numeral "1" indicates this is an ISO OID, the second field/numeral "3" indicates organization, the third field/numeral "6" indicates the Department of Defense (DOD), the fourth field/numeral "1" indicates Internet, and the fifth field/numeral "4" indicates private. It is the remaining portions of the VA-OID to which the present subject matter pertains.

Specifically, remaining element 504 of the VA-OID 500 shows cognitive-specific SNMP augmentations/additions that are defined to implement the cognitive SNMP-based management of virtual agents (VAs) described herein. The first field/numeral in the element 504 indicates the cognitive service port (CS-PORT), alternatively termed the cognitive location of the respective virtual agent. The second field/numeral "Xx1" in the element 504 indicates the respective cognitive service identifier (CS-ID). The third field/numeral "yy1" in the element 504 selectively indicates node-specific cognitive service parameter identifiers (CS-P-IDs) of parameters made available by the respective virtual agent on the respective cognitive service port.

Example parameters of a virtual agent that may be collected and provided by access to the VA-OID 500 are: (i) number of frames of data created; (ii) number of utterances handled pursuant to the defined specification (e.g., per second, per minute, etc.); (iii) number of utterances that resulted in flow through by the virtual agent to another service/entity or to an alternative form of assistance (e.g., another cognitive entity, initiation of communication between the device user and technical support or customer service personnel, etc.); (iv) number of utterances that resulted in successful responses; and, (v) number of utterances that resulted in unsuccessful responses (e.g., virtual agent saying "I do not know that answer"). It should be noted that the above examples are provided as a foundation for implementation of the present technology for cognitive SNMP-based management of virtual agents (VAs). Many additional parameters of a given virtual agent may be defined and implemented according to the detailed description herein, as appropriate for a given virtual agent implementation, and all such parameters are considered within the scope of the present description.

Figure 6:
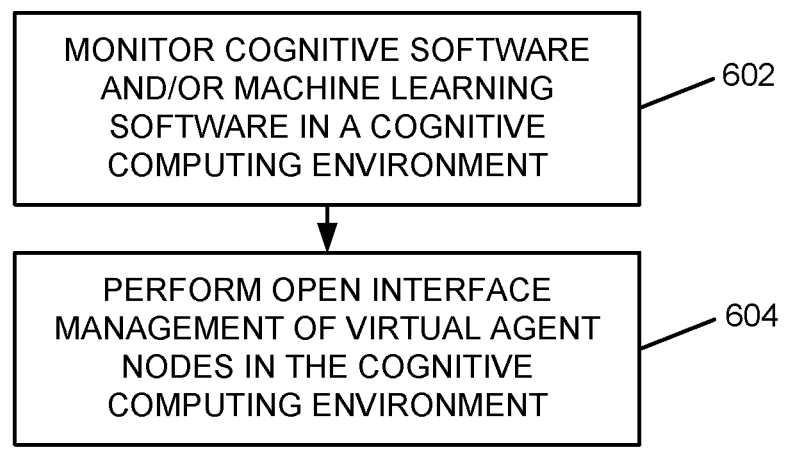
FIG. 6 is a flow chart of an example of an implementation of a process for open interface management of virtual agent nodes according to an embodiment of the present subject matter.
Figure 7:
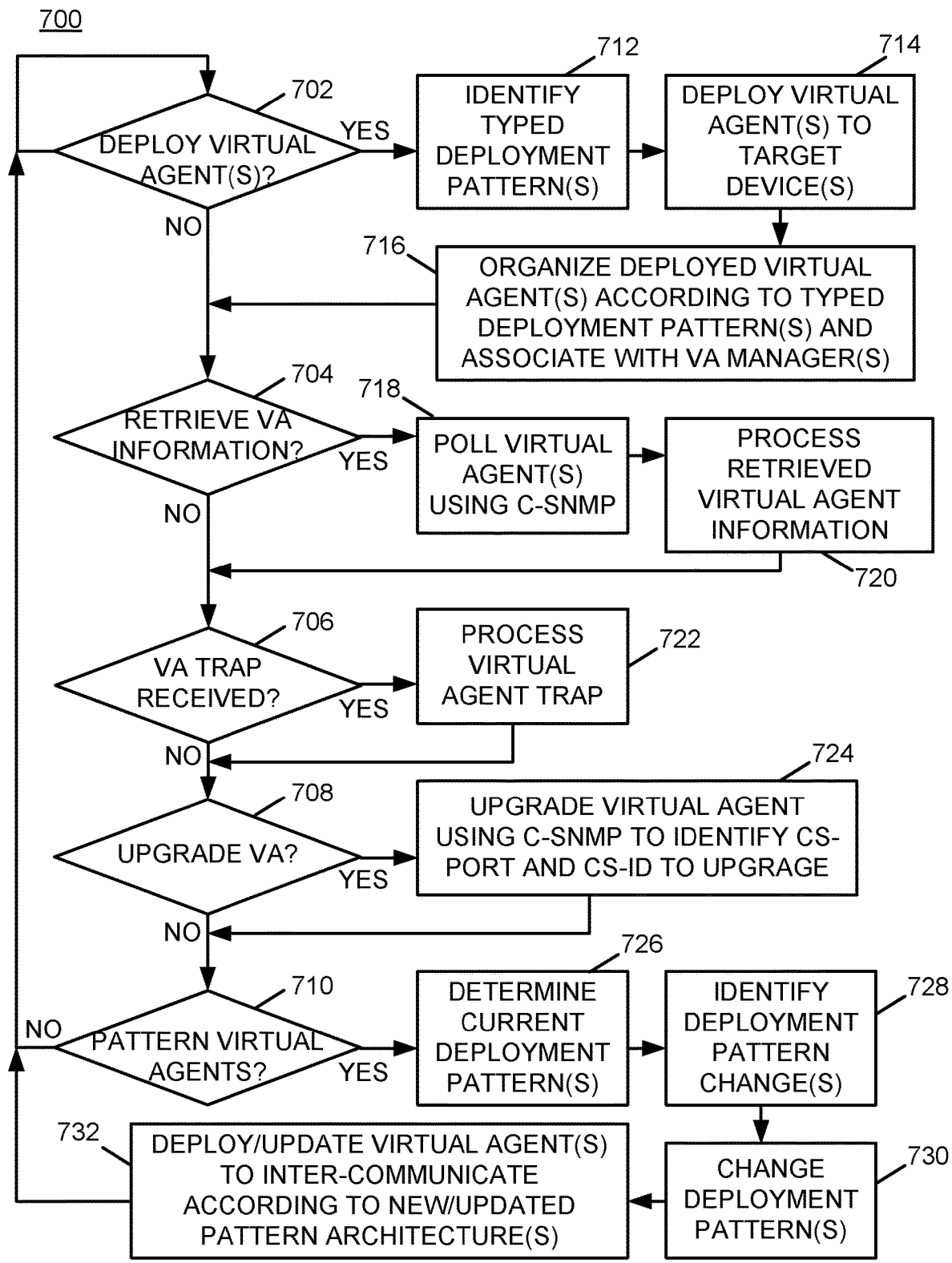
FIG. 7 is a flow chart of an example of an implementation of a process for open interface management of virtual agent nodes that may be performed by one or more virtual agent managers within a variety of typed deployment patterns/architectures to implement cognitive fault, configuration, accounting, performance, and security (C-FCAPS) processing according to an embodiment of the present subject matter.

FIG. 6 through FIG. 7 described below represent example processes that may be executed by devices, such as the core processing module 200, to perform the open interface management of virtual agent nodes associated with the present subject matter. Many other variations on the example processes are possible and all are considered within the scope of the present subject matter. The example processes may be performed by modules, such as the open interface management module 216 and/or executed by the CPU 202, associated with such devices. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added or removed without departure from the scope of the present subject matter.

FIG. 6 is a flow chart of an example of an implementation of a process 600 for open interface management of virtual agent nodes. The process 600 represents a computer-implemented method of performing the subject matter described herein. At block 602, the process 600 monitors cognitive software and/or machine learning software in a cognitive computing environment. At block 604, the process 600 performs open interface management of virtual agent nodes in the cognitive computing environment.

FIG. 7 is a flow chart of an example of an implementation of a process 700 for open interface management of virtual agent nodes. The process 700 represents a computer-implemented method of performing the subject matter described herein. The process 700 further represents an example of processing that may be performed by one or more virtual agent managers within a variety of typed deployment patterns/architectures, as described above, to implement the cognitive fault, configuration, accounting, performance, and security (C-FCAPS) processing described herein. It should additionally be noted that virtual agents may be initially deployed as part of initial device functionality. Alternatively, virtual agents may be deployed and upgraded at any time. Accordingly, the following description addresses deployment and upgrade of virtual agent nodes separately. It should further be understood that all communications described below between a C-FCAPS manager that executes the process 700 and virtual agents may be performed using the cognitive SNMP (C-SNMP) described above. The following description begins with details of higher-level iterative processing to perform several different virtual agent management tasks, followed by details of individual branches of virtual agent management processing.

With respect to the higher-level iterative processing, at decision point 702 the process 700 makes a determination as to whether to deploy one or more virtual agents (VAs). In response to determining not to deploy one or more virtual agents (VAs), the process 700 makes a determination at decision point 704 as to whether to retrieve virtual agent information from one or more deployed virtual agents. In response to determining not to retrieve virtual agent information from one or more deployed virtual agents, the process 700 makes a determination at decision point 706 as to whether a virtual agent (VA) trap has been received from one or more deployed virtual agents. In response to determining that a virtual agent (VA) trap has not been received from one or more deployed virtual agents, the process 700 makes a determination at decision point 708 as to whether to upgrade any deployed virtual agents (VAs). In response to determining not to upgrade any deployed virtual agents (VAs), the process 700 makes a determination at decision point 710 as to whether to pattern deployed virtual agents, which may include initial typed pattern/architecture assignments or typed pattern/architectural changes to one or more sets of deployed virtual agents to assign and/or adjust hierarchical control relationships for open interface management of virtual agent nodes. In response to determining not to pattern deployed virtual agents, the process 700 returns to decision point 702 and iterates as described above to selectively process any of the open interface management tasks described above.

Returning to the description of decision point 702, in response to determining to deploy one or more virtual agents (VAs), at block 712 the process 700 identifies one or more typed deployment patterns that are or that may be utilized to manage newly-deployed virtual agents. As described above, the typed deployment patterns may include strongly-typed patterns, federated patterns, and consolidated patterns, along with other typed deployment and virtual agent management patterns that may be identified as useful over time. At block 714, the process 700 deploys one or more virtual agents to one or more target devices. Cognitive SNMP (C-SNMP) may be utilized to establish VA-OIDs for each parameter that is available for the given virtual agents that are being deployed, such that the respective virtual agents are functional on the respective devices to be queried for virtual agent information and parameters. At block 716, the process 700 organizes the deployed virtual agent nodes according to one or more typed deployment patterns and associates the deployed virtual agents with assigned virtual agent (e.g., C-FCAPS) managers. It should be noted that deployed virtual agents may be organized initially within one typed pattern with a given virtual agent manager, and these associations may be changed at any time to re-architect management of deployed virtual agents. The process 700 returns to decision point 704, and iterates as described above.

Returning to the description of decision point 704, in response to determining to retrieve virtual agent information from one or more deployed virtual agents, at block 718 the process 700 polls one or more virtual agents using the C-SNMP protocol described above. The process 700 may specifically utilize the virtual agent object identifiers (VA-OIDs) and virtual agent management information bases (VA-MIBs) to query/poll the respective virtual agents. As described above, a VA-MIB may identify a hierarchy of deployed virtual agents and available parameters using VA-OIDs. The VA-OIDs specify the respective cognitive service port (CS-PORT), cognitive service identifiers (CS-ID), and node-specific cognitive service parameter identifiers (CS-P-IDs) of the respective virtual agents usable to access specific information associated with the respective virtual agents.

At block 720, the process 700 processes the retrieved virtual agent information. Processing of the retrieved virtual agent information may include a variety of different types of processing. The processing at block 720 may include processing to determine virtual agent load information, effectiveness and interaction throughput, virtual agent feature usage, determinations regarding whether to upgrade particular virtual agent nodes, and other processing as appropriate for a given implementation. Further, and as described above, parameters of a virtual agent that may be collected and provided by access to the VA-OID are: (i) number of frames of data created; (ii) number of utterances handled pursuant to the defined specification (e.g., per second, per minute, etc.); (iii) number of utterances that resulted in flow through by the virtual agent to another service/entity or to an alternative form of assistance (e.g., another cognitive entity, initiate communication between the device user and technical support or customer service personnel, etc.); (iv) number of utterances that resulted in successful responses; and, (v) number of utterances that resulted in unsuccessful responses (e.g., virtual agent saying "I do not know that answer"). It should be noted that the above examples are provided as a foundation for implementation of the present technology for cognitive SNMP-based management of virtual agents (VAs). Many additional parameters of a given virtual agent may be defined and implemented according to the detailed description herein, as appropriate for a given virtual agent implementation, and all such parameters are considered within the scope of the present description. Any of these types and additional available parameters may be utilized and processed to make management decisions about deployed virtual agents. The process 700 returns to decision point 706, and iterates as described above.

Returning to the description of decision point 706, in response to determining that a virtual agent (VA) trap has been received from one or more deployed virtual agents, at block 722 the process 700 processes the received virtual agent trap. For purposes of the present description, processing of the received virtual agent trap may include cognitive processing of information transmitted by the respective deployed virtual agent. The processing of the virtual agent trap may further include determining whether to upgrade the particular virtual agent, whether to change configured/designed virtual agent processing, or other determinations as appropriate for a given implementation. The process 700 returns to decision point 708, and iterates as described above.

Returning to the description of decision point 708, in response to determining to upgrade any deployed virtual agents (VAs), at block 724 the process 700 upgrades the respective virtual agent using C-SNMP to identify the respective CS-PORT and CS-ID to upgrade. Upgrading of any deployed virtual agents (VAs) may further include coordination with the respective C-FCAPS managing node to assist with management of the virtual agent upgrade. The process 700 returns to decision point 710, and iterates as described above.

Returning to the description of decision point 710, in response to determining to pattern deployed virtual agents, at block 726 the process 700 determines one or more current virtual agent deployment pattern(s). As described above, virtual agents may be organized into a variety of typed patterns. The processing at block 726 evaluates current deployment pattern(s) for further evaluation of changes to the respective deployment pattern(s).

At block 728, the process 700 identifies any appropriate deployment pattern changes. Deployment pattern changes may be based, for example, upon load of given sets of virtual agents and throughput capabilities of the respective C-FCAPS managing nodes. Any architectural changes that may improve efficiency may be identified and utilized to change one or more deployment patterns of one or more sets of virtual agents. At block 730, the process 700 changes deployment patterns of any virtual agents for which changes have been identified. Changing deployment patterns may include combining and partitioning sets of virtual agents, and any other rearrangement or restructuring of virtual agent nodes appropriate for a given implementation. At block 732, the process deploys and/or updates one or more virtual agents to inter-communicate according to the new/updated pattern architecture(s). As a result, any changes may be rapidly deployed to promptly improve operations and interactions for open interface management of virtual agent nodes. The process 700 returns to decision point 702, and iterates as described above.

As such, the process 700 performs open interface management of virtual agent nodes using a variety of technical virtual agent deployment and management operations. The process 700 operates to deploy, query, process traps, upgrade, and change deployment patterns for virtual agent nodes. Many other variations on the example processing for open interface management of virtual agent nodes may be performed consistent with the description herein, and all such variations are considered to be within the scope of the present subject matter.

Some embodiments of the present invention may improve the technology of computers in one, or more, of the following ways: (i) improved processing capabilities for management of virtual agent nodes, (ii) improved consistency of processing for deployment and management of virtual agent nodes, (iii) improved control of deployment and deployment patterns and pattern changes for virtual agent node management, (iv) improved computing resource utilization for deployment and management of virtual agent nodes, (v) improved efficiency of computer-based communications for deployment and management of virtual agent nodes, and (vi) improved control of upgrades and feature enhancements for virtual agent nodes.

The present invention is not abstract because it relates particularly to computer operations and/or hardware that improve distributed computer processing and virtual agent computer-interface processing for reasons that may include the following: (i) improving real-time processing capabilities for management of virtual agent nodes, (ii) improving consistency of processing for deployment and management of virtual agent nodes, (iii) improving real-time control of deployment and deployment patterns and pattern changes for virtual agent node management, (iv) improving computing resource utilization for deployment and management of virtual agent nodes, (v) improving efficiency of real-time computer-based communications for deployment and management of virtual agent nodes, and (vi) improving real-time control of upgrades and feature enhancements for virtual agent nodes.

As described above in association with FIG. 1 through FIG. 7, the example systems and processes provide open interface management of virtual agent nodes. Many other variations and additional activities associated with open interface management of virtual agent nodes are possible and all are considered within the scope of the present subject matter.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art based upon the teachings herein without departing from the scope and spirit of the invention. The subject matter was described to explain the principles of the invention and the practical application, and to enable others of ordinary skill in the art to understand the invention for various embodiments with various modifications as are suited to the particular use contemplated.

What is claimed is:

1. A computer-implemented method for performing open interface management of virtual agent nodes in a cognitive computing environment, comprising:

by at least one processor(s) set:

deploying the virtual agent nodes to one or more target device, wherein cognitive Simple Network Management Protocol (C-SNMP) is utilized to establish virtual object identifiers (VA-OID) for each parameter available for the virtual agent nodes being deployed;

organizing the virtual agent nodes being deployed according to one or more typed deployment pattern;

associating the virtual agent nodes with an assigned virtual agent manager monitoring cognitive software and/or machine learning software in the cognitive computing environment;

polling the virtual agent nodes using the C-SNMP protocol utilizing the VA-OID and virtual agent management information bases (VA-MIB) to query the virtual agent nodes, wherein VA-MIB identifies a hierarchy of deployed virtual agents and available parameters using VA-OID to specify a cognitive service port (CS-PORT), cognitive service identifier (CS-ID) and a node-specific cognitive service parameter identifier (CS-P-ID) of the virtual nodes to access virtual agent information of the virtual agent nodes;

processing the virtual agent information to determine whether to upgrade one or more of the virtual agent nodes;

upgrading one or more of the virtual agent nodes using the C-SNMP protocol to identify the CS-PORT and CS-ID being upgraded by the virtual agent manager;

evaluating the one or more typed deployment pattern currently deployed and identify deployment pattern changes based upon load of the virtual agent nodes, throughput of the assigned virtual agent manager and feature usage of the virtual agent nodes; and changing the one or more typed deployment pattern of the virtual agent nodes by combining and partitioning sets of virtual agent nodes.

2. The computer-implemented method of claim 1, wherein the virtual agent information of the virtual agent nodes being provided by access to the VA-OID is selected from the group consisting of a number of frame of data created, number of utterances handled pursuant to a defined specification, a number of utterances resulting in a flow throw by the virtual agent nodes to another service, a number of utterances resulting in successful responses, and a number of utterances that result in unsuccessful responses.

3. The computer-implemented method of claim 1, where polling the virtual agent nodes comprises the assigned virtual agent manager the VA-OID of the virtual agent nodes based upon a configured polling frequency, or the virtual agent nodes send traps to the virtual agent manager.

4. The computer-implemented method of claim 1, where the at least one processor(s) set monitoring the cognitive software and/or machine learning software and performing the open interface management of the virtual agent nodes in the cognitive computing environment comprises the at least one processor(s) set performing cognitive fault, configuration, accounting, performance, and security (C-FCAPS) processing as part of the monitoring and open interface management.

5. The computer-implemented method of claim 1, where:
the virtual agent nodes are deployed within one or more of a strongly-typed deployment pattern, a federated deployment pattern, and a consolidated deployment pattern; and
the at least one processor(s) set monitoring the cognitive software and/or machine learning software and performing the open interface management of the virtual agent nodes in the cognitive computing environment comprises the at least one processor(s) set managing the virtual agent nodes across one or more of the strongly-typed deployment pattern, the federated deployment pattern, and the consolidated deployment pattern.

6. The computer-implemented method of claim 1, further comprising the at least one processor(s) set forming one or more dynamic virtual agent groups and assigning one or more dynamic cognitive virtual agent managers from the virtual agent nodes distributed within the cognitive computing environment.

7. The computer-implemented method of claim 1, where the monitoring and open-interface management are performed by the at least one processor(s) set in a cloud computing environment.

8. A system for performing open interface management of virtual agent nodes in a cognitive computing environment, comprising:
a communication module; and
at least one processor(s) set programmed to:
deploy the virtual agent nodes to one or more target device, wherein cognitive Simple Network Management Protocol (C-SNMP) is utilized to establish virtual object identifiers (VA-OID) for each parameter available for the virtual agent nodes being deployed;
organize the virtual agent nodes being deployed according to one or more typed deployment pattern;
associating the virtual agent nodes with an assigned virtual agent manager monitoring, via the communication module, cognitive software and/or machine learning software in the cognitive computing environment;
poll the virtual agent nodes using the C-SNMP protocol utilizing the VA-OID and virtual agent management information bases (VA-MIB) to query the virtual agent nodes, wherein VA-MIB identifies a hierarchy of deployed virtual agents and available parameters using VA-OID to specify a cognitive service port (CS-PORT), cognitive service identifier (CS-ID) and a node-specific cognitive service parameter identifier (CS-P-ID) of the virtual nodes to access virtual agent information of the virtual agent nodes;
process the virtual agent information to determine whether to upgrade one or more of the virtual agent nodes;
upgrade one or more of the virtual agent nodes using the C-SNMP protocol to identify the CS-PORT and CS-ID being upgraded by the virtual agent manager;
evaluate the one or more typed deployment pattern currently deployed and identify deployment pattern changes based upon load of the virtual agent nodes, throughput of the assigned virtual agent manager and feature usage of the virtual agent nodes; and
change the one or more typed deployment pattern of the virtual agent nodes by combining and partitioning sets of virtual agent nodes.

9. The system of claim 8, wherein the virtual agent information of the virtual agent nodes being provided by access to the VA-OID is selected from the group consisting of a number of frame of data created, number of utterances handled pursuant to a defined specification, a number of utterances resulting in a flow throw by the virtual agent nodes to another service, a number of utterances resulting in successful responses, and a number of utterances that result in unsuccessful responses.

10. The system of claim 8, where polling the virtual agent nodes comprises the assigned virtual agent manager the VA-OID of the virtual agent nodes based upon a configured polling frequency, or the virtual agent nodes send traps to the virtual agent manager.

11. The system of claim 8, where, in being programmed to monitor the cognitive software and/or machine learning software and perform the open interface management of the virtual agent nodes in the cognitive computing environment, the at least one processor(s) set is programmed to perform cognitive fault, configuration, accounting, performance, and security manager (C-FCAPS) processing as part of the monitoring and open interface management.

12. The system of claim 8, where:
the virtual agent nodes are deployed within one or more of a strongly-typed deployment pattern, a federated deployment pattern, and a consolidated deployment pattern; and
where, in being programmed to monitor the cognitive software and/or machine learning software and perform the open interface management of the virtual agent nodes in the cognitive computing environment, the at least one processor(s) set is programmed to manage the virtual agent nodes across one or more of the strongly-typed deployment pattern, the federated deployment pattern, and the consolidated deployment pattern.

13. The system of claim 8, where the at least one processor(s) set is programmed to form one or more dynamic virtual agent groups and assign one or more dynamic cognitive virtual agent managers from the virtual agent nodes distributed within the cognitive computing environment.

14. A computer program product for performing open interface management of virtual agent nodes in a cognitive computing environment, comprising:
a computer readable storage medium having computer readable program code embodied therewith, where the computer readable storage medium is not a transitory signal and where the computer readable program code when executed on a computer causes the computer to:
deploy the virtual agent nodes to one or more target device, wherein cognitive Simple Network Management Protocol (C-SNMP) is utilized to establish virtual object identifiers (VA-QID) for each parameter available for the virtual agent nodes being deployed;
organize the virtual agent nodes being deployed according to one or more typed deployment pattern;
storing cognitive software and/or machine learning software in the cognitive computing environment;
poll the virtual agent nodes using the C-SNMP protocol utilizing the VA-QID and virtual agent management information bases (VA-MIB) to query the virtual agent nodes, wherein VA-MIB identifies a hierarchy of deployed virtual agents and available parameters using VA-QID to specify a cognitive service port (CS-PQRT), cognitive service identifier (CS-ID) and a node-specific cognitive service parameter identifier (CSP-ID) of the virtual nodes to access virtual agent information of the virtual agent nodes;
process the virtual agent information to determine whether to upgrade one or more of the virtual agent nodes;
upgrade one or more of the virtual agent nodes using the C-SNMP protocol to identify the CS-PQRT and CS-ID being upgraded by the virtual agent manager;
evaluate the one or more typed deployment pattern currently deployed and identify deployment pattern changes based upon load of the virtual agent nodes, throughput of the assigned virtual agent manager and feature usage of the virtual agent nodes; and
change the one or more typed deployment pattern of the virtual agent nodes by combining and partitioning sets of virtual agent nodes.

15. The computer program product of claim 14, wherein the virtual agent information of the virtual agent nodes being provided by access to the VA-OID is selected from the group consisting of a number of frame of data created, number of utterances handled pursuant to a defined specification, a number of utterances resulting in a flow throw by the virtual agent nodes to another service, a number of utterances resulting in successful responses, and a number of utterances that result in unsuccessful responses.

16. The computer program product of claim 14, where polling the virtual agent nodes comprises the assigned virtual agent manager the VA-OID of the virtual agent nodes based upon a configured polling frequency, or the virtual agent nodes send traps to the virtual agent manager.

17. The computer program product of claim 14, where, in causing the computer to monitor the cognitive software and/or machine learning software and perform the open interface management of the virtual agent nodes in the cognitive computing environment, the computer readable program code when executed on the computer causes the computer to perform cognitive fault, configuration, accounting, performance, and security (C-FCAPS) processing as part of the monitoring and open interface management.

18. The computer program product of claim 14, where:
the virtual agent nodes are deployed within one or more of a strongly-typed deployment pattern, a federated deployment pattern, and a consolidated deployment pattern; and
in causing the computer to monitor the cognitive software and/or machine learning software and perform the open interface management of the virtual agent nodes in the cognitive computing environment, the computer readable program code when executed on the computer causes the computer to manage the virtual agent nodes across one or more of the strongly-typed deployment pattern, the federated deployment pattern, and the consolidated deployment pattern.

19. The computer program product of claim 14, where the computer readable program code when executed on the computer further causes the computer to form one or more dynamic virtual agent groups and assign one or more dynamic cognitive virtual agent managers from the virtual agent nodes distributed within the cognitive computing environment.

20. The computer program product of claim 14, where the monitoring and open-interface management are performed by the computer in a cloud computing environment.

* * * * *